(No Model.)
T. TAYLOR.
PROCESS OF AND APPARATUS FOR TREATING COTTON SEED.
No. 276,305. Patented Apr. 24, 1883.
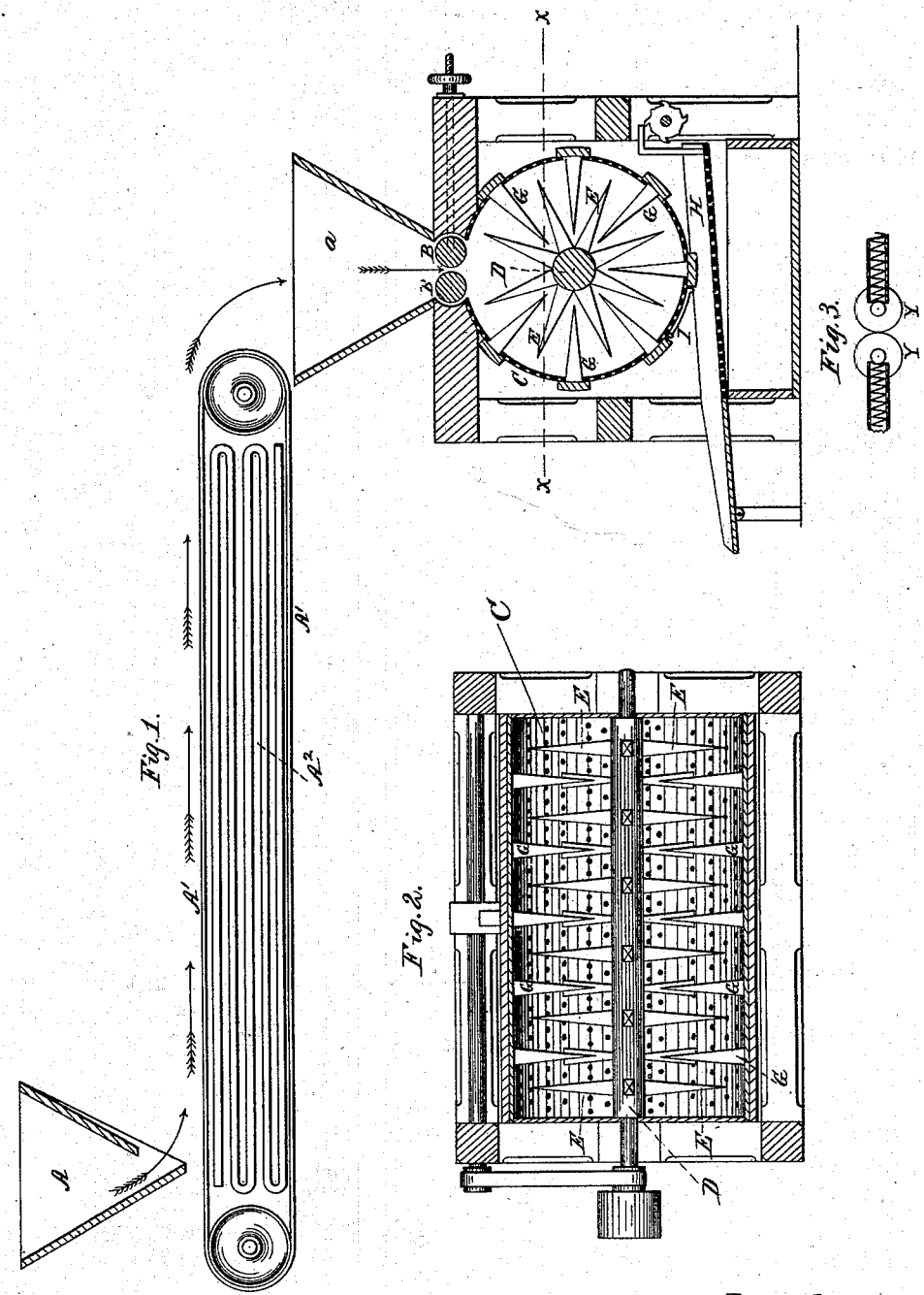
Witnesses:
W. C. Jinduston
A. F. Stewart
Inventor:
Thomas Taylor
by
Melville Church
his Attorney.

UNITED STATES PATENT OFFICE.

THOMAS TAYLOR, OF WASHINGTON, DISTRICT OF COLUMBIA.

PROCESS OF AND APPARATUS FOR TREATING COTTON-SEED.

SPECIFICATION forming part of Letters Patent No. 276,305, dated April 24, 1883.

Application filed February 1, 1883. (No model.)

*To all whom it may concern:*

Be it known that I, THOMAS TAYLOR, of Washington, in the District of Columbia, have invented a certain new and Improved Process of and Apparatus for Treating Cotton-Seed; and I do hereby declare the following to be a full, clear, and exact description of the same, such as will enable those skilled in the art to which it appertains to practice the same.

Heretofore in the treatment of cotton-seed difficulty has been experienced in effecting economically a thorough separation of the kernel or food product from the hull of the seed and from the fiber adhering to the hull, on the one hand, and in separating the fiber from the hull particles in condition fit for manufacture on the other hand.

The object of my present invention, therefore, is to provide such a course of treatment as will enable the kernel or food product to be easily and effectually separated in a pure state, free from particles of hull and fibers of cotton, and suitable for food for cattle, for fertilizing purposes, or for the manufacture of oil or oil-cake, and also so as to leave the particles of hull and the fiber adherent thereto in such condition as to permit of the ready separation of the maximum amount of fiber from the hulls suitable for commercial purposes.

In carrying out my invention I take the seed to be treated in the condition in which it comes from the gin and subject it to a degree of heat sufficient to drive off the greater proportion of the natural moisture, though not so high as to expel the oil from the cells of the plantlet within the kernel, or scorch or change the color of the adherent fibers of cotton, or injure the texture of the latter in any way. This heating operation may be accomplished by submitting the cotton-seed to the action of hot air, at a temperature ranging between 90° and 240° Fahrenheit, for a length of time proportioned to the degree of heat employed. The effect of this drying or desiccating operation is, first, to render both the hull and kernel brittle, and, secondly, to shrink the kernel from the internal surface of the hull. When the seed has become sufficiently dried it is next subjected to a crushing or grinding process, by means of which the hull and kernel are cracked and the kernel liberated from the hull, the hull being considerably broken up, while the kernel or food product is ground to a powder. Then, by a process of beating and screening, the ground kernel or flour is separated from the hull particles and adherent fiber, leaving the latter in condition to be separated from each other by any approved means. The cotton-seed flour produced in the mode described is free from all deleterious substance and in suitable condition to be compressed for the extraction of oil and the formation of oil-cake, or to be otherwise used, while the cotton secured (ordinarily regarded as a waste product) may be wholly freed from the broken hull, to which it adheres, and utilized.

In the accompanying drawings I show a simple form of apparatus for carrying out my invention. Figure 1 is a view of such apparatus, partly in section and partly in elevation. Fig. 2 is a view, partly in section and partly in plan, taken on the line $xx$ of Fig. 3; and Fig. 3, a view of the rolls for separating the hulls from the fiber.

Similar letters indicate the same parts.

A represents a hopper into which the seed to be treated is fed; A', an endless belt, of canvas, wire-cloth, or other suitable material, upon which the seed is distributed as it falls from the hopper A, and by which it is conveyed to and discharged into a second hopper, $a$. This belt is given a slow progressive movement by any suitable means.

$A^2$ represents a steam-coil arranged within the endless belt and adapted to heat and dry the seed sufficiently to fit them for the subsequent grinding and separating operations.

B B represent two cylinders or rollers, preferably rotated at differential speed, between which the seed passes as it descends from hopper $a$, and by which the hull is broken and its kernel ground to a powder, as described.

C represents a perforated cylinder or screen, into which the ground material passes after leaving the rolls, and D is a shaft passing longitudinally through the cylinder and carrying arms or beaters E, which co-operate with corresponding arms, G, projecting radially from the interior of the cylinder to beat and toss about the material and cause the flour to pass out through the meshes of the cylinder, the hulls and adherent fiber being retained within the cylinder. Below the perforated cylinder is arranged an inclined vibrating screen, H, having a mesh finer than that of the cylinder C, and upon this inclined screen the material passed through the cylinder C falls, the finer portions being sifted through into a receptacle beneath, the coarser portions, mingled with such hull particles as may pass through the meshes of the cylinder C, traveling over the surface of the inclined screen, being tailed off over the lower end of the same and collected, to be again ground and screened, if desirable. When a sufficient quantity of the hulled particles and adherent fiber has collected in the cylinder C a hinged section, I, of the cylinder may be opened and the material removed and conveyed to the mechanism for effecting the separation of the fiber from the hull particles.

Various means may be employed for separating the fiber from the hull particles, but perhaps the simplest contrivance consists of two rotating rolls, Y Y, adjusted closely together and held by spring-pressure, as shown in Fig. 3. Between these rolls the hull and adherent fiber is passed, the hull being ground to a powder and becoming detached from the fiber, while the latter remains comparatively uninjured. Instead of employing additional rolls for effecting this result, the rolls B B, used for crushing the hull and liberating the kernels, may be employed; but in such case they would have to be adjusted close together instead of slightly apart, as when performing their ordinary function, one of them being rendered capable of adjustment for this purpose.

While the apparatus shown and described will be found effective in carrying out my improved process, it need not be necessarily employed, as any other form of apparatus adapted to perform the crushing or grinding of the seeds and the separation of the kernel or food product from the hull and adherent fiber may be employed instead.

Having thus described my invention, I claim as new—

1. The improved mode or process of treating cotton-seed herein described, consisting in subjecting the seed to the action of heat for the purpose of drying the kernel and the hull and shrinking the former from the latter, then crushing the seed, so as to simultaneously break the hull and pulverize the kernel, and then separating the pulverized kernel from the hull particles and adherent fiber, substantially as set forth.

2. The herein-described mode of treating cotton-seed, consisting in subjecting the seed to the action of heat for the purpose of drying the kernel and the hull and shrinking the former from the latter, then crushing the seed, so as to simultaneously break the hull and pulverize the kernel, then separating the pulverized kernel from the hull particles and adherent fiber, and finally separating the adherent fiber from the hull particles, substantially as described.

3. In an apparatus for treating cotton-seed, the combination of means for heating and drying the seed, rollers for crushing the seed, so as to break the hull and pulverize the kernel, screening devices for separating the hull particles and adherent fiber from the pulverized kernel, and means, substantially as described, for detaching the adherent fiber from the hull particles.

4. In an apparatus for treating cotton-seed, the combination of the endless belt or apron, the heater within it, the grinding-rolls, the perforated cylinder, its shaft, and the beating-arms, substantially as described.

THOMAS TAYLOR.

Witnesss:
WILLIAM FITCH,
WM. A. JOHNSON.